US012633973B2

(12) United States Patent
Liu et al.

(10) Patent No.: US 12,633,973 B2
(45) Date of Patent: May 19, 2026

(54) METHOD AND APPARATUS FOR PUSCH TRANSMISSIONS

(71) Applicant: LENOVO (BEIJING) LIMITED, Beijing (CN)

(72) Inventors: Bingchao Liu, Beijing (CN); Chenxi Zhu, Fairfax, VA (US); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 694 days.

(21) Appl. No.: 17/262,161

(22) PCT Filed: Aug. 1, 2018

(86) PCT No.: PCT/CN2018/098116
§ 371 (c)(1),
(2) Date: Jan. 21, 2021

(87) PCT Pub. No.: WO2020/024176
PCT Pub. Date: Feb. 6, 2020

(65) Prior Publication Data
US 2021/0288700 A1 Sep. 16, 2021

(51) Int. Cl.
*H04B 7/0456* (2017.01)
*H04B 7/0404* (2017.01)
(Continued)

(52) U.S. Cl.
CPC ......... *H04B 7/0456* (2013.01); *H04B 7/0404* (2013.01); *H04L 5/0048* (2013.01); *H04W 72/04* (2013.01)

(58) Field of Classification Search
None
See application file for complete search history.

(56) References Cited

U.S. PATENT DOCUMENTS

2019/0280751 A1* 9/2019 Tsai .................... H04L 25/0226
2019/0327693 A1* 10/2019 Rahman ................ H04W 52/42
(Continued)

FOREIGN PATENT DOCUMENTS

WO 2018132781 A1 1/2018

OTHER PUBLICATIONS

"ETSI TS 138 214 V15.2.0 (Jul. 2018)—5G; NR; Physical layer procedures for data", 3GPP TS 38.214 version 15.2.0 Release 15, Jul. 2018 (Year: 2018).*
(Continued)

*Primary Examiner* — Jenkey Van
(74) *Attorney, Agent, or Firm* — Kunzler, Needham & Hilton

(57) ABSTRACT

The present disclosure relates to methods and apparatuses for PUSCH transmissions. According to an embodiment of the present disclosure, a method can include: configuring a transmission configuration parameter set for a Type-1 physical uplink shared channel transmission for a user equipment, and transmitting the transmission configuration parameter set to the user equipment. Wherein: in the case that a transmission scheme of the user equipment is configured as codebook-based transmission, two or more transmit precoding matrix indicators are configured; and in the case that the transmission scheme of the user equipment is configured as non-codebook-based transmission, two or more indications for sounding reference signal resource indicator are configured; and transmitting the transmission configuration parameter set to the user equipment.

20 Claims, 12 Drawing Sheets

(51) Int. Cl.
    *H04L 5/00*        (2006.01)
    *H04W 72/04*    (2023.01)

(56)          References Cited

U.S. PATENT DOCUMENTS

| | | | | |
|---|---|---|---|---|
| 2019/0342911 | A1* | 11/2019 | Talarico | H04L 5/0098 |
| 2020/0106591 | A1* | 4/2020 | Chen | H04B 7/0456 |
| 2020/0275416 | A1* | 8/2020 | Haghighat | H04B 7/0628 |
| 2021/0058126 | A1* | 2/2021 | Park | H04B 7/0456 |
| 2021/0058274 | A1* | 2/2021 | Osawa | H04L 25/0226 |
| 2021/0068142 | A1* | 3/2021 | Park | H04W 72/0453 |
| 2021/0099214 | A1* | 4/2021 | Ren | H04B 7/0456 |
| 2021/0160104 | A1* | 5/2021 | Wu | H04W 72/0446 |
| 2021/0185718 | A1* | 6/2021 | Ying | H04L 1/0061 |

OTHER PUBLICATIONS

3GPP, 3rd Generation Partnership Project; Technical Specification Group Radio Access Network; Corrections for Codebook Based UL MIMO, 3GPP R1-1800690, Jan. 2018, pp. 1-7.

3GPP, 3rd Generation Partnership Project; Technical Specification Group Radio Access Network; Remaining issues on codebook based URL transmission, 3GPP R2-1802095 Feburary 2018, pp. 1-4.

3GPP, 3rd Generation Partnership Project; Technical Specification Group Radio Access Network; Session Notes for Agenda Item 7.1.2, 3GPP R2-1805711, Apr. 2018, pp. 1-27.

International Searching Authority, "Notification of Transmittal of the International Search Report and the Written Opinion of the International Searching Authority, or the Declaration", PCT/IB2018/098116, Aug. 1, 2018, pp. 1-6.

Ericsson, UL MIMO procedures for non-codebook based transmission, 3GPP TSG-RAN WG1 #89ah-NR, R1-1711009, Jun. 27-30, 2017, pp. 1-3, Qingdao, China.

Vivo, Discussion on Codebook Based UL Transmission, 3GPP TSG RAN WG1 Meeting #90, R1-1712830, Aug. 21-25, 2017, pp. 1-6, Prague, P.R. Czech.

Samsung, Codebook-based UL transmission, 3GPP TSG RAN WG1 NR Ad-Hoc#3, R1-1715927, Sep. 18-21, 2017, pp. 1-13, Nagoya, Japan.

CATT, "Remaining issues on codebook based UL transmission", 3GPP TSG RAN WG1 Meeting #92bis R1-1803738, Apr. 16-20, 2018, pp. 1-5.

\* cited by examiner configuring a transmission configuration parameter set for a Type-1 PUSCH transmission for a UE — 202 transmitting the transmission configuration parameter set to the UE — 204 receiving a transmission configuration parameter set for a Type-1 PUSCH transmission — 302 performing the Type-1 PUSCH transmission based on the received transmission configuration parameter set — 304

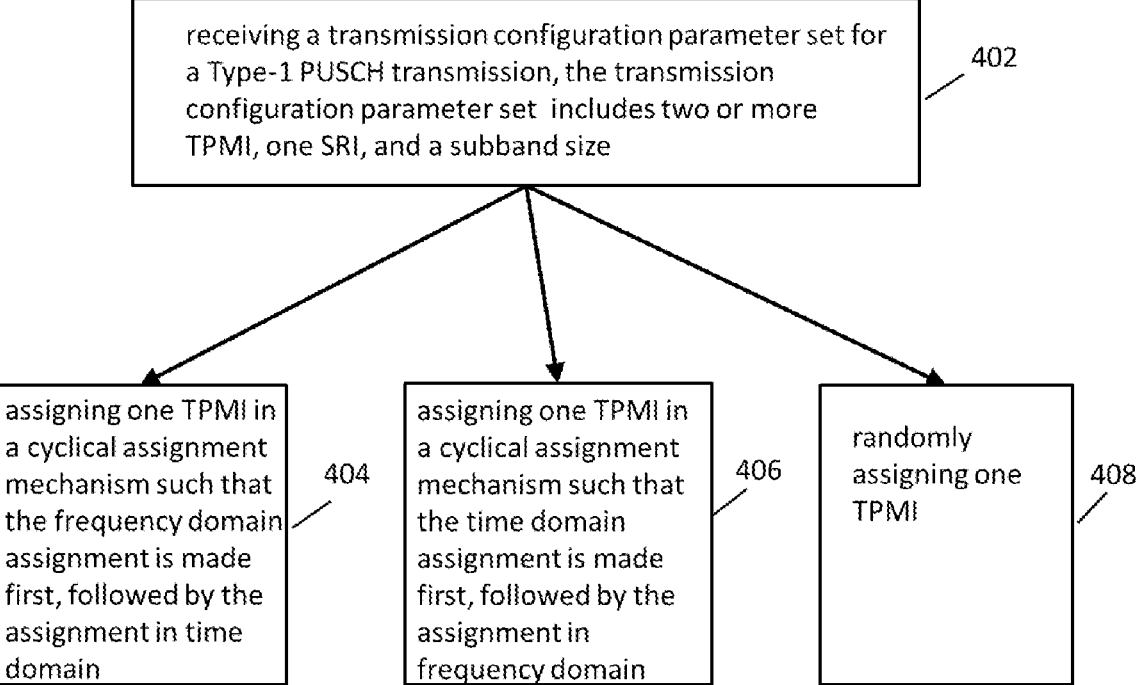

receiving a transmission configuration parameter set for a Type-1 PUSCH transmission, the transmission configuration parameter set includes two or more TPMI, one SRI, and a subband size  — 402 assigning one TPMI in a cyclical assignment mechanism such that the frequency domain assignment is made first, followed by the assignment in time domain — 404 assigning one TPMI in a cyclical assignment mechanism such that the time domain assignment is made first, followed by the assignment in frequency domain — 406 randomly assigning one TPMI — 408

FIG. 4

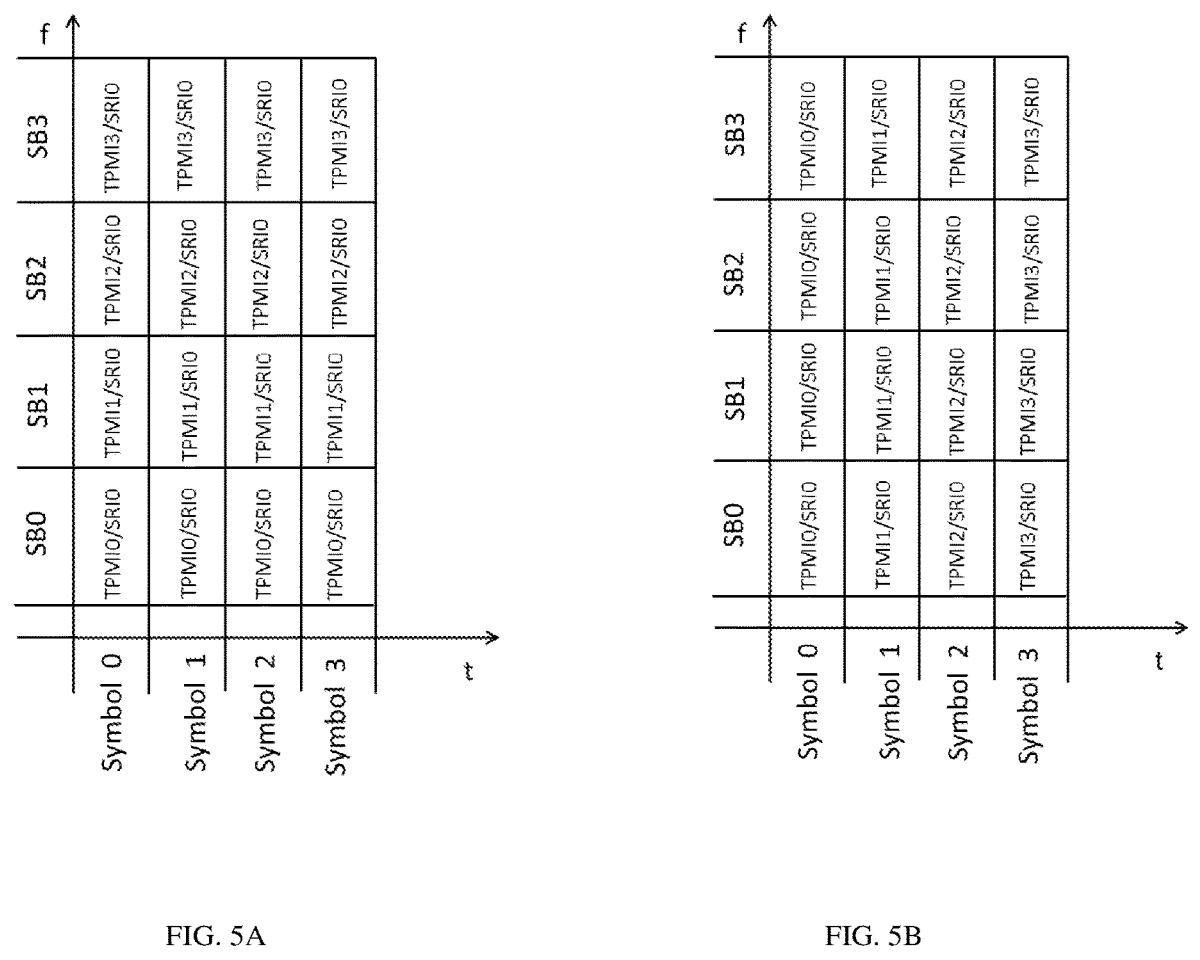

|  | SB0 | SB1 | SB2 | SB3 |
|---|---|---|---|---|
| Symbol 0 | TPMI0/SRI0 | TPMI1/SRI0 | TPMI2/SRI0 | TPMI3/SRI0 |
| Symbol 1 | TPMI0/SRI0 | TPMI1/SRI0 | TPMI2/SRI0 | TPMI3/SRI0 |
| Symbol 2 | TPMI0/SRI0 | TPMI1/SRI0 | TPMI2/SRI0 | TPMI3/SRI0 |
| Symbol 3 | TPMI0/SRI0 | TPMI1/SRI0 | TPMI2/SRI0 | TPMI3/SRI0 |

FIG. 5A

|  | SB0 | SB1 | SB2 | SB3 |
|---|---|---|---|---|
| Symbol 0 | TPMI0/SRI0 | TPMI0/SRI0 | TPMI0/SRI0 | TPMI0/SRI0 |
| Symbol 1 | TPMI1/SRI0 | TPMI1/SRI0 | TPMI1/SRI0 | TPMI1/SRI0 |
| Symbol 2 | TPMI2/SRI0 | TPMI2/SRI0 | TPMI2/SRI0 | TPMI2/SRI0 |
| Symbol 3 | TPMI3/SRI0 | TPMI3/SRI0 | TPMI3/SRI0 | TPMI3/SRI0 |

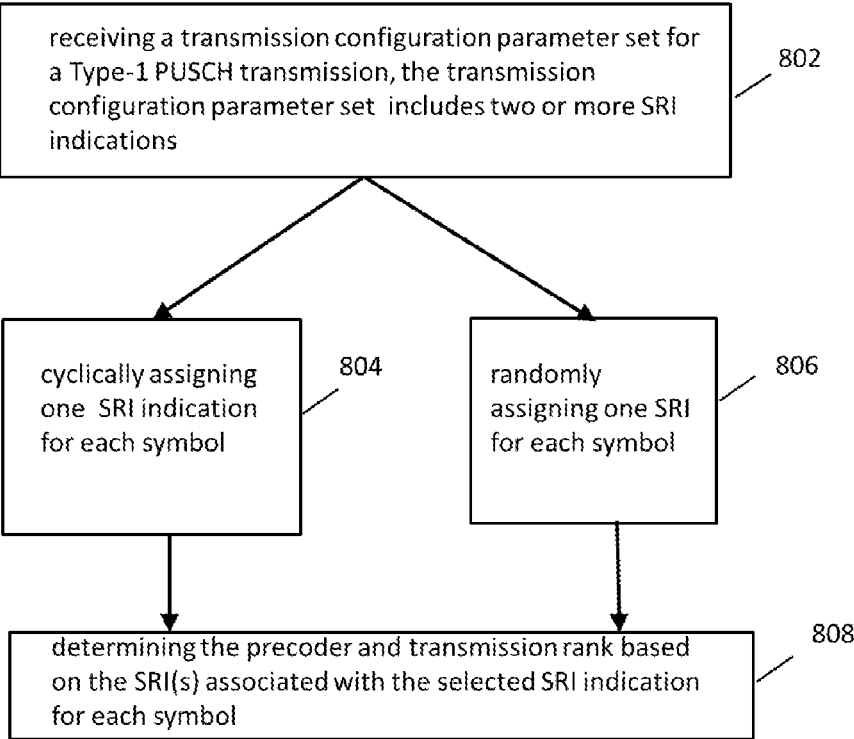

receiving a transmission configuration parameter set for a Type-1 PUSCH transmission, the transmission configuration parameter set includes two or more SRI indications — 802 cyclically assigning one SRI indication for each symbol — 804 randomly assigning one SRI for each symbol — 806 determining the precoder and transmission rank based on the SRI(s) associated with the selected SRI indication for each symbol — 808

METHOD AND APPARATUS FOR PUSCH TRANSMISSIONS

TECHNICAL FIELD

The present disclosure is related to wireless communication technology, and more particularly, related to physical uplink shared channel (PUSCH) transmissions in multiple-input multiple-output (MIMO) scheme.

BACKGROUND

In a new radio (NR) system, MIMO technology is a method for using multiple transmission and receiving antennas to exploit multipath propagation so as to increase the capacity of a radio link.

Meanwhile, in the NR system, a PUSCH transmission can be dynamically scheduled by an uplink (UL) grant in a downlink control information (DCI), or can be semi-persistently scheduled by an UL grant in a DCI after the reception of a high layer parameter. On the other hand, a PUSCH transmission can be semi-statically configured upon reception of a high layer parameter without detection of an UL grant in a DCI, which is also referred to as "Type-1 PUSCH transmission" as defined in TS 38.214.

More specifically, both codebook and non-codebook based transmission schemes are supported for the Type-1 PUSCH transmission. For the codebook based transmission scheme, only one transmission precoding matrix indicator (TPMI) and one sounding reference signal resource indicator (SRI) are configured for the Type-1 PUSCH transmission. For the non-codebook based transmission scheme, only one SRI indication is configured for the Type-1 PUSCH transmission. However, these schemes are designed for stationary user equipment (UE). For a moving UE with nonzero velocity in the NR system, the current schemes with fixed TPMI and SRI for PUSCH transmissions is unadaptable or unreasonable.

Thus, the industry desires a novel configuration technology for Type-1 PUSCH transmission in the NR system.

SUMMARY OF THE DISCLOSURE

One embodiment of the present disclosure provides a method, including: configuring a transmission configuration parameter set for a Type-1 PUSCH transmission for a user equipment. In the case that a transmission scheme of the user equipment is configured as codebook based transmission, two or more transmit precoding matrix indicators are configured; and in the case that the transmission scheme of the user equipment is configured as non-codebook based transmission, two or more indications for sounding reference signal resource indicator are configured. The method can include transmitting the transmission configuration parameter set to the user equipment.

Another embodiment of the present disclosure provides an apparatus, including: at least one processor, and at least one memory including computer program codes. The at least one memory and the computer program codes are configured to, with the at least one processor, cause the apparatus to perform: configure a transmission configuration parameter set for a Type-1 PUSCH transmission for a user equipment, wherein: in the case that a transmission scheme of the user equipment is configured as codebook based transmission, two or more transmit precoding matrix indicators are configured; and in the case that the transmission scheme of the user equipment is configured as non-codebook based transmission, two or more indications for sounding reference signal resource indicator are configured. The apparatus can include a transmitter coupled to the at least one processor that transmits the transmission configuration parameter set to the user equipment.

A further embodiment of the present disclosure provides a method, including: receiving a transmission configuration parameter set for a Type-1 PUSCH transmission, and performing the Type-1 PUSCH transmission based on the received transmission configuration parameter set. In the case that a transmission scheme of the user equipment is configured as codebook based transmission in the transmission configuration parameter set, two or more transmit precoding matrix indicators are configured in the transmission configuration parameter set; and in the case that the transmission scheme of the user equipment is configured as non-codebook based transmission in the transmission configuration parameter set, two or more indications for sounding reference signal resource indicator are configured in the transmission configuration parameter set.

Yet another embodiment of the present disclosure provides an apparatus, including: a receiver that receives a transmission configuration parameter set for a Type-1 PUSCH transmission, and a transmitter coupled to the receiver that performs the Type-1 PUSCH transmission based on the received transmission configuration parameter set. In the case that a transmission scheme of the user equipment is configured as codebook based transmission in the transmission configuration parameter set, two or more transmit precoding matrix indicators are configured in the transmission configuration parameter set; and in the case that the transmission scheme of the user equipment is configured as non-codebook based transmission in the transmission configuration parameter set, two or more indications for sounding reference signal resource indicator are configured in the transmission configuration parameter set.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered limiting of its scope.

FIG. 4 illustrates a method for Type-1 PUSCH transmissions in a codebook based transmission scheme according to an embodiment of the present disclosure;

FIG. 5A illustrates an example TPMI cyclical assignment mechanism according to an embodiment of the present disclosure, which can be applied in the method illustrated in FIG. 4;

FIG. 5B illustrates another example TPMI cyclical assignment mechanism according to an embodiment of the present disclosure, which can be applied in the method illustrated in FIG. 4;

FIG. 7A illustrates an example of TPMI and SRI cyclical assignment mechanism according to an embodiment of the present disclosure, which can be applied in the method illustrated in FIG. 6;

FIG. 7B illustrate another example of TPMI and SRI cyclical assignment mechanism according to an embodiment of the present disclosure, which can be applied in the method illustrated in FIG. 6;

FIG. 8 illustrates a method for Type-1 PUSCH transmissions in a non-codebook based transmission scheme according to an embodiment of the present disclosure;

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Figure 1:
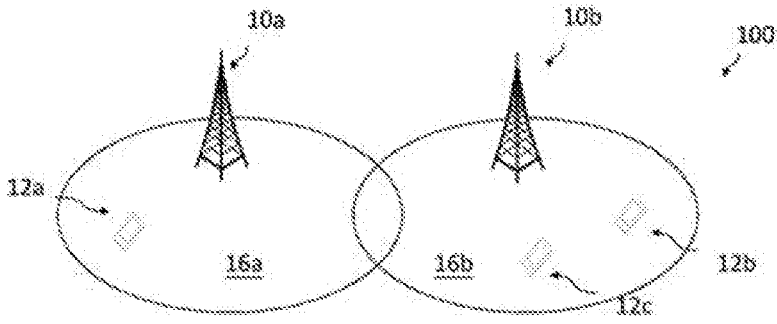
FIG. 1 illustrates a schematic view of a wireless communication system according to an embodiment of the present disclosure.

FIG. 1 illustrates a schematic view of a wireless communication system 100 according to an embodiment of the present disclosure.

As shown in FIG. 1, the wireless communication system 100 includes a plurality of base stations including base stations 10a and 10b, and a plurality of UEs including UEs 12a, 12b and 12c. The plurality of base stations 10a, 10b may be based on the standards of 3G, long-term evolution (LTE), LTE-Advanced (LTE-A), 4G, new radio (NR), or other suitable standards. For example, the plurality of base stations 10a, 10b may be a plurality of eNBs, or a plurality of gNBs. In some embodiments of the disclosure, the plurality of base stations 10a, 10b may be controlled by a control unit (not shown in FIG. 1, e.g. a server, a processor, a computer or the like). Each of the base stations 10a, 10b may define one or more cells, such as cell 16a or 16b, and each cell may support mobility management through the radio resource control (RRC) signaling. A group of cells 16a, 16b may form a radio access network-based (RAN-based) notification area (RNA). The UE 12a, 12b or 12c may be a computing device, a wearable device, and a mobile device, etc.

In current specification TS38.331 specified by the 3rd Generation Partnership Project (3GPP), for a codebook based transmission scheme, only one TPMI and one SRI are configured for a Type-1 PUSCH transmission; and meanwhile, for a non-codebook based transmission scheme, only one SRI indication is configured for a Type-1 PUSCH transmission. This configuration manner may work well for a stationary UE. However, for a moving UE with a certain velocity greater than zero, the spatial information is time-varying for a frequency-selective channel. Hence, still using the fixed TPMI, SRI, or SRI indication for a PUSCH transmission is unreasonable for the moving UE.

Embodiments of the present disclosure propose a technical solution for Type-1 PUSCH transmissions, which can at least solve the above technical problem in the new generation communication systems, such as 5G communication systems.

More details on the embodiments of the present disclosure will be illustrated in the following text in combination with the appended drawings.

Figure 2:
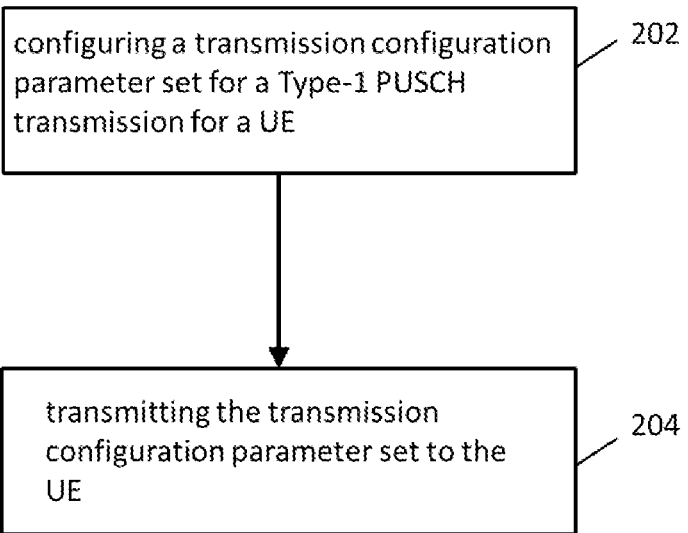
FIG. 2 illustrates a method for Type-1 PUSCH transmissions according to an embodiment of the present disclosure.

FIG. 2 illustrates a method for Type-1 PUSCH transmissions according to an embodiment of the present disclosure, which can be performed in an apparatus, such as a base station.

As shown in FIG. 2, in step 202, an apparatus, for example, a base station configures a transmission configuration parameter set for a Type-1 PUSCH for a user equipment (UE). The UE can be a moving UE with nonzero velocity. Configuring the transmission configuration parameter set can include configuring the type of the transmission scheme of the UE, and configuring precoders or beams for Type-1 PUSCH transmissions of the UE dependent on the type of the transmission scheme of the UE. The type of the transmission scheme of the UE can be codebook based transmission or non-codebook based transmission.

For example, in an embodiment of the present disclosure, the transmission scheme of the UE can be configured as codebook-based transmission in the transmission configuration parameter set, and two or more TPMIs can be configured in the transmission configuration parameter set.

According to an embodiment of the present application, in the case that a transmission scheme of the UE is configured as codebook based transmission in the transmission configuration parameter set, the transmission configuration parameter set can also include parameters for configuring a subband size. For example, the subband size can represent two physical resource blocks, four physical resource blocks, or a whole band size configured for PUSCH transmission.

According to an embodiment of the present application, in the case that a transmission scheme of the UE is configured as codebook based transmission in the transmission configuration parameter set, the transmission configuration parameter set can also include parameters for configuring one or two SRIs.

According to an embodiment of the present disclosure, the transmission scheme can be configured by a high layer parameter in the transmission configuration parameter set, for example, as a codebook based transmission scheme or non-codebook based transmission scheme by a high layer parameter "txConfig." Similarly, the TPMIs and SRIs can be also configured by high layer parameters in the transmission configuration parameter set. In an embodiment of the present disclosure, two or more TPMIs can be configured by high layer parameters "precodingAndNumberofLayers." For example, two TPMIs can be configured by the high layer parameters "precodingAndNumberofLayers0" and "precodingAndNumberofLayers1," respectively. In an embodiment of the present disclosure, one or two SRIs can be configured by high layer parameters "srs-ResourceIndicator." For example, two SRIs can be configured by the high layer parameters "srs-ResourceIndicator0" and "srs-ResourceIndicator1," respectively.

In another embodiment of the present disclosure, a transmission scheme of the UE can be configured as non-codebook based transmission by the high layer parameters in the transmission configuration parameter set. In addition, two or more indications for SRI, which can be referred to as "SRI indications," can also be configured in the transmission configuration parameter set. Similarly, the SRI indications can be also configured by a high layer parameter in the transmission configuration parameter set. In an embodiment of the present disclosure, two or more SRI indications can be configured by the high layer parameters "srs-ResourceIndi-cator." For example, two SRI indications can be configured by the high layer parameters "srs-ResourceIndicator0" and "srs-ResourceIndicator1," respectively.

One SRI indication may indicate one or more SRI(s). According to an embodiment of the present disclosure, the mapping relationship between SRI indications and SRIs is shown in Table 1 below, wherein Table 1 is the same as the right two columns of Table 7.3.1.1.2-31 defined in TS38.212 specified by 3GPP. For example, in the case of "SRI indi-cation" being equal to one of "0," "1," "2," "3" values; corresponding "SRI" value is "0," "1," "2," "3" respectively. While, in the case that "SRI indication" has a value of "4" or more, corresponding "SRI" value can have two or more value. Each SRI value, e.g., "0," "1," "2," or "3," represents a resource index indicating one sounding reference signal (SRS) resource with one SRS port, for example, being assigned for one SRS resource for non-codebook based transmission. As an example, in the case that SRI indication has a value of "11," it corresponds to SRI values "0," "1," and "3." The SRI values "0," "1," and "3" represent the resource indices "0," "1," and "3" indicating three SRS resources with one SRS port.

TABLE 1

| Mapping from SRI indication to SRIs | |
|---|---|
| SRI indication | SRI(s) |
| 0 | 0 |
| 1 | 1 |
| 2 | 2 |
| 3 | 3 |
| 4 | 0, 1 |
| 5 | 0, 2 |
| 6 | 0, 3 |
| 7 | 1, 2 |
| 8 | 1, 3 |
| 9 | 2, 3 |
| 10 | 0, 1, 2 |
| 11 | 0, 1, 3 |
| 12 | 0, 2, 3 |
| 13 | 1, 2, 3 |
| 14 | 0, 1, 2, 3 |
| 15 | reserved |

In step 204, the configured transmission configuration parameter set can be transmitted, for example by the base station to the UE.

Figure 3:
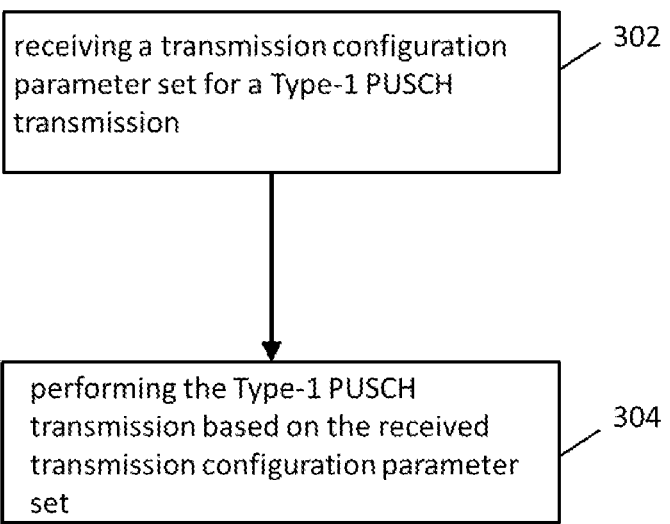
FIG. 3 illustrates a method for Type-1 PUSCH transmissions according to another embodiment of the present disclosure.

FIG. 3 illustrates a method for Type-1 PUSCH transmis-sions according to another embodiment of the present dis-closure, which can be performed in an apparatus, such as UE. The UE can be a moving UE with a nonzero velocity.

As shown in FIG. 3, in step 302, an apparatus, for example, a moving UE, receives a transmission configura-tion parameter set for a Type-1 PUSCH transmission. The transmission configuration parameter set can include a con-figuration parameter for the type of the transmission scheme of the UE, and a configuration parameter for precoders or beams for Type-1 PUSCH transmissions of the UE depen-dent on the type of the transmission scheme of the UE. The type of the transmission scheme of the UE can be codebook based transmission or non-codebook based transmission, which can be configured by a high layer parameter in the transmission configuration parameter set, for example a high layer parameter "txConfig."

In an embodiment of the present disclosure, the transmis-sion scheme of the user equipment can be configured as codebook based transmission in the transmission configu-ration parameter set. The transmission configuration param-eter set can also configure two or more TPMIs, for example, by using the high layer parameter "precodingAndNumbero-fLayers."

According to an embodiment of the present application, in the case that a transmission scheme of the UE is configured as codebook based transmission in a transmission configu-ration parameter set, the transmission configuration param-eter set can also include a configuration parameter of a subband size. The subband size can be two physical resource blocks, four physical resource blocks, or a whole band size.

According to an embodiment of the present application, in the case that a transmission scheme of the UE is configured as codebook based transmission in the transmission con-figuration parameter set, the transmission configuration parameter set can also include parameters for configuring one or two SRIs, for example the high layer parameter "srs-ResourceIndicator."

In another embodiment of the present disclosure, a trans-mission scheme of the UE can be configured as non-codebook based transmission in the transmission configu-ration parameter set. The transmission configuration parameter set can also include two or more SRI indications configured by a high layer parameter. For example, two or more SRI indications can be configured by the high layer parameter "srs-ResourceIndicator." One SRI indication can indicate one or more SRI(s) according to a mapping rela-tionship between SRI indications and SRIs, for example as being defined in Table 7.3.1.1.2-31 of TS38.212 specified by 3GPP.

In step 304, the UE can perform Type-1 PUSCH trans-mission based on the received transmission configuration parameter set.

FIG. 4 illustrates a method for Type-1 PUSCH transmis-sions in a codebook based transmission scheme according to an embodiment of the present disclosure, which can be performed in an apparatus, such as a UE.

As shown in FIG. 4, in step 402, an apparatus, for example, a moving UE with nonzero velocity, receives a transmission configuration parameter set for a Type-1 PUSCH transmission. The transmission configuration parameter set can include a high layer parameter configuring the transmission scheme of the UE to be codebook based transmission, and include high layer parameters configuring two or more TPMIs and one SRI. The transmission con-figuration parameter set can further also include a high layer parameter configuring a subband size, which can be two physical resource blocks, four physical resource blocks, or a whole band size. In another embodiment of the present disclosure, the transmission configuration parameter set may not include the parameter for configuring the subband size. In such situation, the subband size can be a default value, for example, a whole band size.

The UE can perform the Type-1 PUSCH transmission based on the received transmission configuration parameter set in various manners. For example, in step 404, according to an embodiment of the present disclosure, the UE can assign one TPMI from the configured two or more TPMIs for the Type-1 PUSCH transmission in a cyclical assignment mechanism, such as, for example, illustrated in FIG. 5A where the frequency domain assignment is made first, followed by the assignment in time domain.

Specifically, FIG. 5A illustrates an exemplary embodiment of the present disclosure for assigning a TPMI in a cyclical assignment mechanism across multiple subbands associated with each transmitted symbol, which can be applied in the method illustrated in FIG. 4. In this example, TPMI is assigned in a frequency domain first, followed by the assignment in the time domain. For example, starting with Symbol 0, the first TPMI is assigned to subband 0 (SB0), the second TPMI is assigned to SB1, the third TPMI is assigned to SB2 and fourth TPMI is assigned to SB3, with the same TPMI assignment order across subbands SB0 through SB3 repeated for successive symbols like Symbol 1, Symbol 2, etc . . . As further indicated in FIG. 5A, four TPMIs, i.e., TPMI0, TPMI1, TPMI2, and TPMI3, and one SRI, i.e., SRI0 can be configured by the received transmission configuration parameter set for each UE as shown in FIG. 5A. Persons skilled in the art can understand that the four subbands, four TPMIs assigned to such subbands and the described order of assignment, and four symbols are only used for illustrative purpose only. Other numbers of subbands, TPMIs and assignment order of TPMIs to subband taught or suggested in the present disclosure can also be used.

As shown in FIG. 5A, starting with Symbol 0, the UE, for examples, assigns TPMI0 to SB0 and applies the precoding matrix indicated by the TPMI0, over the antenna ports corresponding to the SRS resources indicated by the SRI0 for SB0 of symbol 0, i.e. perform y=Wx, where x is the transmitted signal, W is the precoding matrix, y is the signal transmitted using the antenna ports corresponding to the SRS resources indicated by the SRI0. Similarly, UE can assign TPMI1 to SB1 and apply the precoding matrix indicated by the TPMI1 over the antenna ports corresponding to the SRS resource indicated by the SRI0 for SB1 of symbol 0, i.e. UE perform y=Wx, where x is the transmitted signal, W is the precoding matrix, y is just the signal transmitted using the antenna ports corresponding to the SRS resources indicated by the SRI0. Next, UE can assign TPMI2 to SB2 and apply the precoding matrix indicated by the TPMI2 over the antenna ports corresponding to the SRS resources indicated by the SRI0 for SB2 of symbol 0, i.e. perform y=Wx, where x is the transmitted signal, W is the precoding matrix, y is just the signal transmitted using the antenna ports corresponding to the SRS resources indicated by the SRI0. Finally, UE can assign TPMI3 to SB3 and apply the precoding matrix indicated by the TPMI3, over the antenna ports corresponding to the SRS resource indicated by the SRI0 for SB3 of symbol 0, i.e. perform y=Wx, where x is the transmitted signal, W is the precoding matrix, y is the signal transmitted using the antenna ports corresponding to the SRS resources indicated by the SRI0. The same TPMI assignment order across subbands SB0 through SB3 are then repeated for successive symbols like Symbol 1, Symbol 2, and Symbol 3.

Referring to step 406 in FIG. 4, according to an embodiment of the present disclosure, the UE can assign one TPMI from the two or more TPMIs for the Type-1 PUSCH transmission in a cyclical assignment mechanism, for example, illustrated in FIG. 5B where the time domain assignment is made first, followed by the assignment in frequency domain.

Specifically, FIG. 5B illustrates another exemplary embodiment of the present disclosure for assigning a TPMI in a cyclical assignment mechanism across multiple symbols associated with each subband, which can be applied in the method illustrated in FIG. 4. In this example, TPMI is assigned in the time domain first, followed by the assignment in the frequency domain. For example, starting with SB0, the first TPMI is assigned to Symbol 0, the second TPMI is assigned to Symbol 1, the third TPMI is assigned to Symbol 2 and the fourth TPMI is assigned to Symbol 3, with the same TPMI assignment order across symbol 0 through symbol 3 repeated for successive subbands like SB1, SB2, etc . . . As further indicated in FIG. 5B, four TPMIs, i.e., TPMI0, TPMI1, TPMI2 and TPMI3, and one SRI, i.e. SRI0, can be configured by the received transmission configuration parameter set for each UE, four symbols, i.e., symbol 0, symbol 1, symbol 2, and symbol 3, and four subbands, i.e., SB0, SB1, SB2, and SB3 are shown in FIG. 5B. Persons skilled in the art can understand that the four subbands, four TPMIs assigned to such subbands and the described order of assignment, and four symbols are only used for illustrative purpose only. Other numbers of subbands, symbols, TPMIs and assignment order of TPMIs to subband taught or suggested in the present disclosure can also be used.

As shown in FIG. 5B, starting with SB0, UE can assign TPMI0 to symbol 0 and apply the precoding matrix indicated by the TPMI0 over the antenna ports corresponding to the SRS resource indicated by the SRI0 for SB0 of symbol 0, i.e. perform y=Wx, where x is the transmitted signal, W is the precoding matrix, y is just the signal transmitted using the antenna ports corresponding to the SRS resources indicated by the SRI0. Similarly, the UE can assign TPMI1 to symbol 1 and apply the precoding matrix indicated by the TPMI1 over the antenna ports corresponding to the SRS resource indicated by the SRI0 for SB0 of symbol 1, i.e. perform y=Wx, where x is the transmitted signal, W is the precoding matrix, y is just the signal transmitted using the antenna ports corresponding to the SRS resources indicated by the SRI0. Next, the UE can assign TPMI2 to symbol 2 and apply the precoding matrix indicated by the TPMI2 over the antenna ports corresponding to the SRS resource indicated by the SRI0 for SB0 of symbol 2, i.e. perform y=Wx, where x is the transmitted signal, W is the precoding matrix, y is just the signal transmitted using the antenna ports corresponding to the SRS resources indicated by the SRI0. Finally, the UE can assign TPMI3 to symbol 3 and apply the precoding matrix indicated by the TPMI3 over the antenna ports corresponding to the SRS resource indicated by the SRI0 for SB0 of symbol 3, i.e. perform y=Wx, where x is the transmitted signal, W is the precoding matrix, y is just the signal transmitted using the antenna ports corresponding to the SRS resources indicated by the SRI0. The same TPMI assignment order across symbol 0 through symbol 3 are repeated for subbands like SB1, SB2, and SB3.

Referring to step 408 shown in FIG. 4, according to an embodiment of the present application, UE can randomly assign one TPMI from the received two or more TPMIs, and apply the precoding matrix indicated by the selected TPMI over the antenna ports corresponding to the SRS resource indicated by the SRI for one subband.

FIGS. 5A and 5B illustrate steps 404 and 406 in FIG. 4 by using four subbands, respectively. Persons skilled in the art can understand that the same assignment mechanism in steps 404-408 can also be applied for the case that the subband size is a whole band size. In the case that the subband size is the whole band size, the UE can cyclically or randomly assign one TPMI for each symbol.

Figure 6:
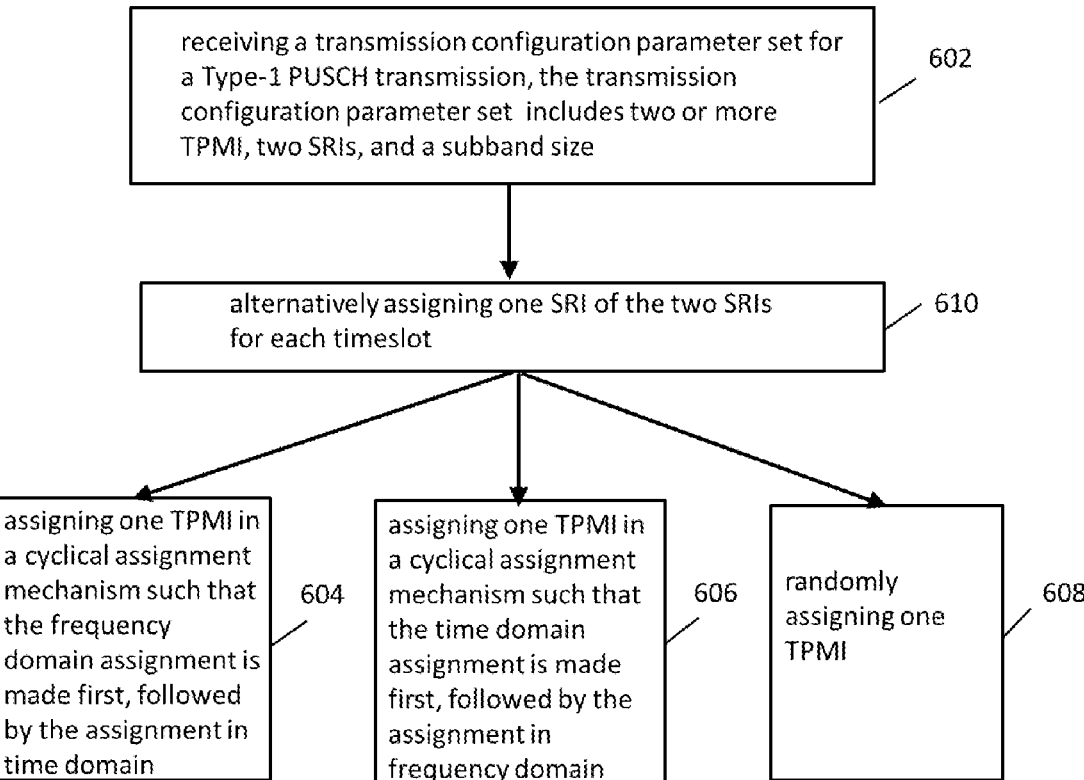
FIG. 6 illustrates a method for Type-1 PUSCH transmissions in a codebook based transmission scheme according to another embodiment of the present disclosure.

FIG. 6 illustrates a method for Type-1 PUSCH transmissions in a codebook based transmission scheme according to another embodiment of the present disclosure, which can be performed in an apparatus, such as a UE.

As shown in FIG. 6, in step 602, an apparatus, for example, a moving UE with nonzero velocity, receives a transmission configuration parameter set for a Type-1 PUSCH transmission. The transmission configuration parameter set can include a high layer parameter configuring the transmission scheme of the user equipment to be code-book based transmission, and include another high layer parameter configuring two or more TPMIs and two SRIs. The transmission configuration parameter set further can also include a high layer parameter configuring a subband size, which can be two physical resource blocks, four physical resource blocks, or a whole band size. In another embodiment of the present disclosure, the transmission configuration parameter set cannot include the parameter for configuring the subband size. In such situation, the subband size can be a default value, for example, a whole band size.

Figure 7A:
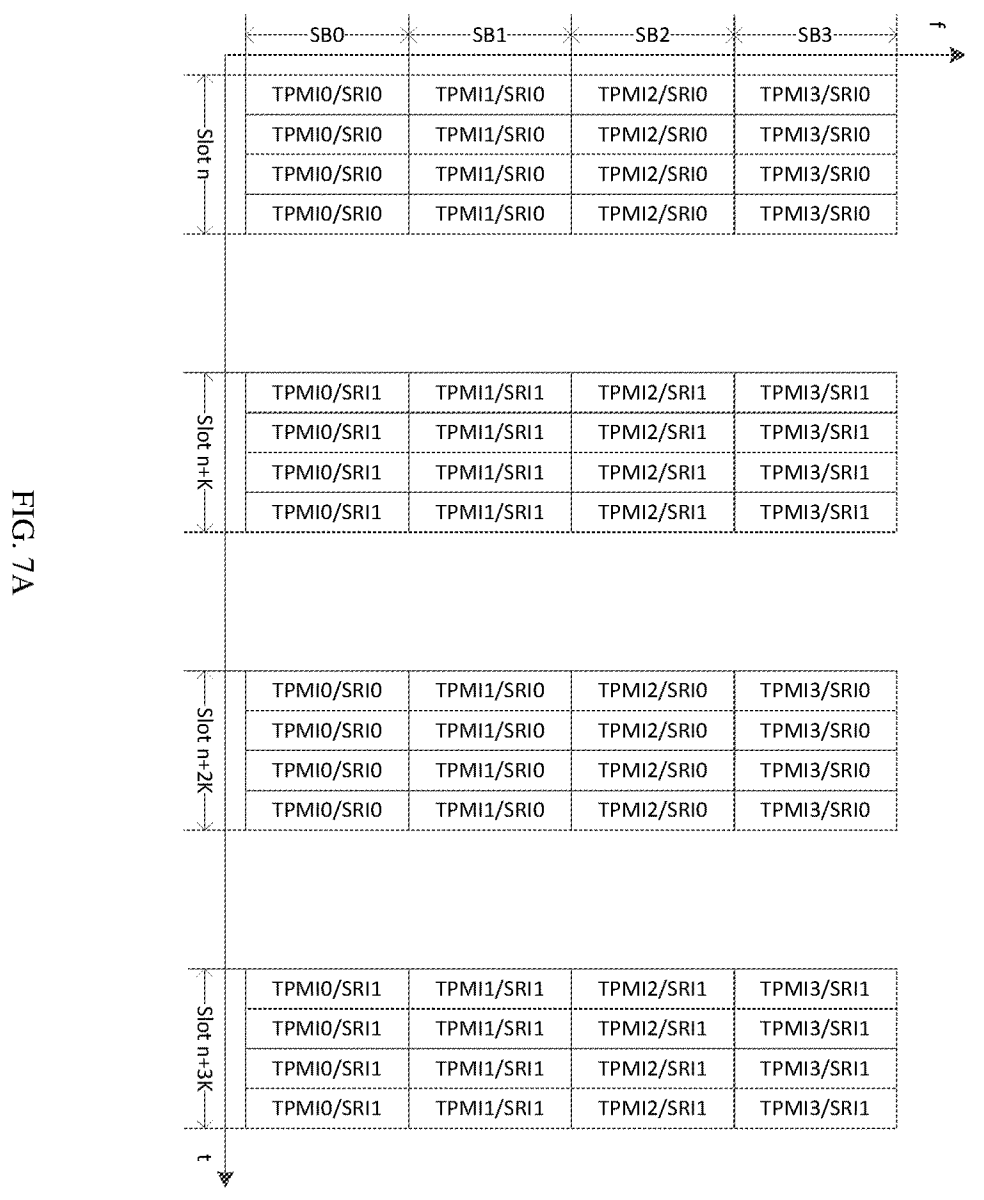
Figure 7B:
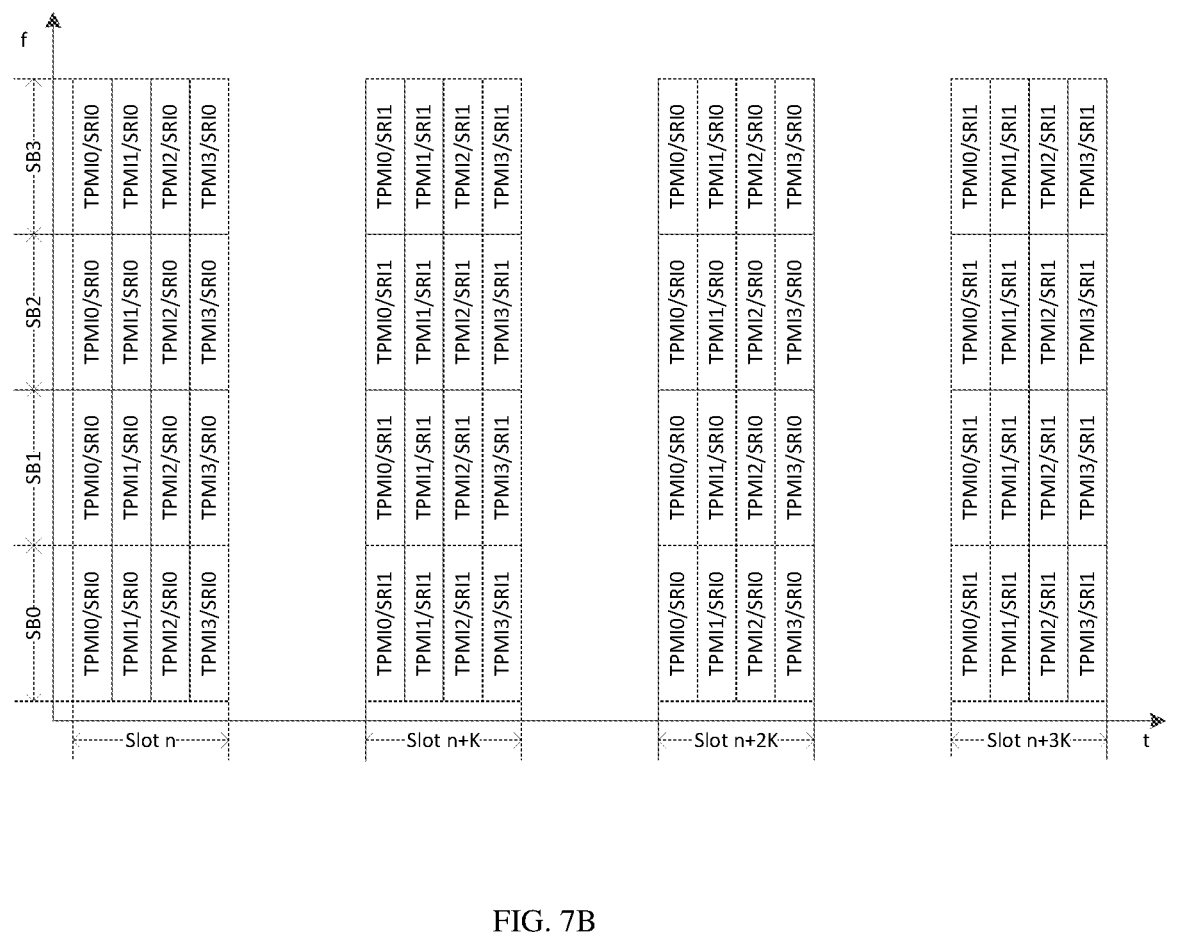

The UE can perform the Type-1 PUSCH transmission based on the received transmission configuration parameter set in various manners. For example, in step 610, according to an embodiment of the present disclosure, the UE can alternatively assign one SRI of the two SRIs for each timeslot for the Type-1 PUSCH transmission. In one timeslot, the UE can use one SRI for the Type-1 PUSCH transmission as illustrated in FIGS. 7A and 7B, which will be explained in the following context.

Referring to step 604 in FIG. 6, according to an embodiment of the present disclosure, for each timeslot, the UE can assign one TPMI from the two or more TPMIs for the Type-1 PUSCH transmission in a cyclical assignment mechanism such that the assignment is performed in a frequency domain first, followed by the assignment in time domain, which is the same as step 404 in FIG. 4.

Referring to step 606 in FIG. 6, according to an embodiment of the present disclosure, for each timeslot, the UE can assign one TPMI from the two or more TPMIs for the Type-1 PUSCH transmission in a cyclical assignment mechanism such that assignment is performed in time domain first, followed by the assignment in the frequency domain, which is the same as step 406 in FIG. 4.

Referring to step 608 in FIG. 6, according to an embodiment of the present disclosure, for each timeslot, the UE can randomly assign one TPMI from the received two or more TPMI, and use the precoding matrix indicated by the assigned TPMI over the antenna ports corresponding to the SRS resource indicated by the SRI for one subband, which is the same as step 408 in FIG. 4.

FIG. 7A illustrates an exemplary embodiment of the present disclosure for assigning a TPMI and SRI in a cyclical assignment mechanism, which can be applied in the method illustrated in FIG. 6. In this example, SRI is alter-natively assigned for each timeslot and in each timeslot, TPMI is assigned in a frequency domain first, followed by the assignment in the time domain. For example, starting with timeslot n, first SRI (e.g. SRI0) is assigned to timeslot n, second SRI (e.g. SRI1) is assigned to timeslot n+k, then, the first SRI (e.g. SRI0) is also assigned to timeslot n+2k, and the second SRI (e.g. SRI1) is assigned to timeslot n+3k, with the same SRI assignment order for successive timeslots. As further indicated in FIG. 7A, four TPMIs, i.e., TPMI0, TPMI1, TPMI2, and TPMI3, and two SRIs, i.e., SRI0 and SRI1, are configured in the received transmission configuration parameter set for each UE, four timeslots, i.e., timeslot n, timeslot n+k, timeslot n+2k, and timeslot n+3k, wherein k is the period between two adjacent Type-1 PUSCH transmissions allocated by the high layers, and four subbands, i.e., SB0, SB1, SB2, and SB3 are shown in FIG. 7A. Persons skilled in the art can understand that the four subbands, four TPMIs, and the four timeslots are only for illustrative purpose only. Other numbers of subbands, TPMIs, and timeslots taught or suggested in the present disclosure can also be used.

As shown in FIG. 7A, the UE can assign SRI0 for timeslot n, assign SRI1 for timeslot n+k, assign SRI0 to timeslot n+2k, and assign SRI1 to timeslot n+3k. In general, the UE can alternatively assign one of the two SRIs for each timeslot such that the adjacent timeslots for Type-1 PUSCH transmission allocated by the high layers do not use the same SRI. For each timeslot in FIG. 7A, the operation is the same as FIG. 5A.

FIG. 7B illustrates another exemplary embodiment of the present disclosure for assigning TPMI and SRI in a cyclical assignment mechanism, which can be applied in the method illustrated in FIG. 6. In this example, SRI is alternatively assigned for each timeslot and in each timeslot, TPMI is assigned in the time domain first, followed by the assign-ment in the frequency domain. The difference between FIG. 7B and FIG. 7A merely lies in that for each timeslot in FIG. 7B, the operation is the same as FIG. 5B.

FIG. 8 illustrates a method for Type-1 PUSCH transmis-sions in a non-codebook based transmission scheme accord-ing to an embodiment of the present disclosure, which can be performed in an apparatus, such as a UE.

As shown in FIG. 8, in step 802, an apparatus, for example, a moving UE with nonzero velocity, receives a transmission configuration parameter set for a Type-1 PUSCH transmission. The transmission configuration parameter set can include a high layer parameter configuring the transmission scheme of the user equipment to be non-codebook based transmission, and include another high layer parameter configuring two or more SRI indications, wherein one SRI indication indicates one or more SRIs as shown in table 1.

Figure 9:
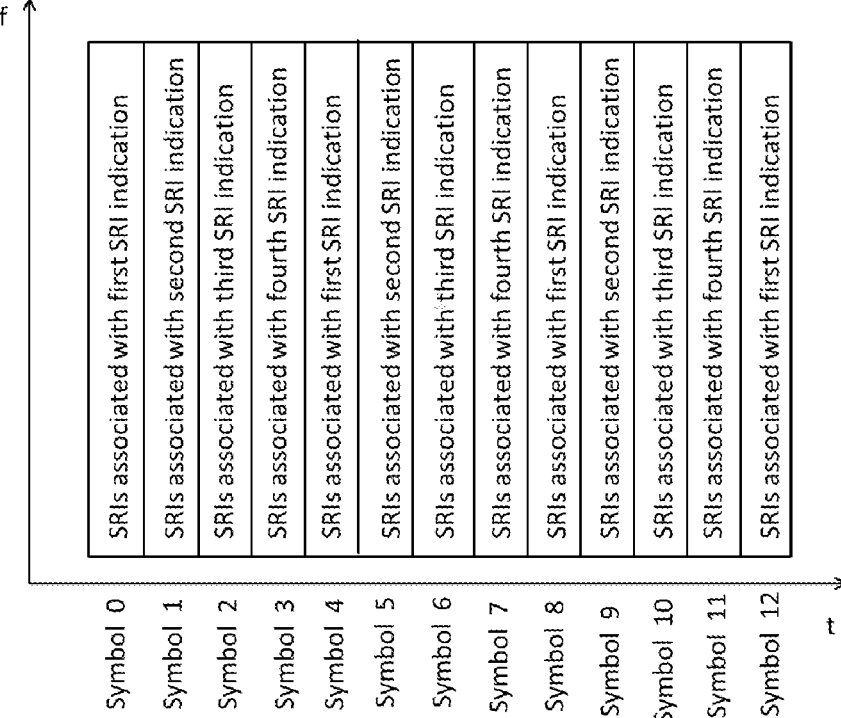
FIG. 9 illustrates an example SRI indication cyclical assignment mechanism according to an embodiment of the present disclosure, which can be applied in the method illustrated in FIG. 8.

Referring to step 804 in FIG. 8, according to an embodi-ment of the present disclosure, the UE can use a cyclical assignment mechanism to assign one SRI indication from the received two or more SRI indications for each symbol for the Type-1 PUSCH transmission, which is illustrated in FIG. 9.

Specifically, FIG. 9 illustrates an exemplary embodiment where SRI indication is assigned for each successive symbol in a cyclical assignment mechanism, which can be applied in the method illustrated in FIG. 8. For example, starting with symbol 0, the first SRI indication is assigned to Symbol 0, the second SRI indication is assigned to Symbol 1, the third SRI indication is assigned to Symbol 2 and the fourth SRI indication is assigned to Symbol 3, with the same SRI indication assignment order repeated for successive symbols like symbol 4, symbol 5, symbol 6, symbol 7, etc . . . Each SRI indication can be set by any value defined in Table 1. Referring to FIG. 9, four SRI indications—the first SRI indication, the second SRI indication, the third SRI indica-tion, and the fourth SRI indication, can be configured in the received transmission configuration parameter set for each UE and thirteen symbols, i.e., symbol 0 to symbol 12 shown in FIG. 9. Persons skilled in the art can understand that the four SRI indications and thirteen symbols are only used for illustrative purpose only. Other numbers of SRI indications and symbols are also taught or suggested in the present disclosure can also be used. As shown in FIG. 9, starting with symbol 0, UE can assign the first SRI indication to Symbol 0, assign the second SRI indication to Symbol 1, assign the third SRI indication to Symbol 2, and assign the fourth SRI indication to Symbol 3. The same SRI indication assignment order is repeated for successive symbols 4 to 12.

Referring to step 806 in FIG. 8, according to an embodiment of the present disclosure, the UE can randomly assign one SRI indication from the received two or more SRI indications for each symbol for the Type-1 PUSCH transmission.

In step 808, the UE can determine the precoder and transmission rank based on the SRI(s) associated with the assigned SRI indication for each symbol. The mapping relationship between SRI indications and SRIs is shown in Table 1 above. According to an embodiment of the present disclosure, the UE can use the precoder and transmission rank over the antenna port corresponding to the SRS resources indicated by SRIs.

Figure 10:
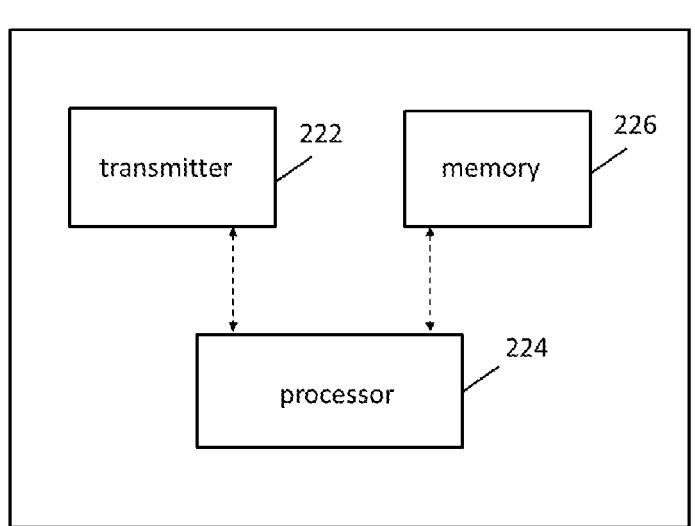
FIG. 10 illustrates a block diagram of an apparatus for Type-1 PUSCH transmissions according to an embodiment of the present disclosure.

FIG. 10 illustrates a block diagram of an apparatus 220 for Type-1 PUSCH transmissions according to an embodiment of the present disclosure.

Referring to FIG. 10, the apparatus 220, for example a base station, may include a transmitter 222, at least one processor 224, and at least one memory 226 including computer program codes. The at least one memory 226 and the computer program codes are configured to, with the at least one processor 224, cause the apparatus 220 to perform: configure a transmission configuration parameter set for a Type-1 PUSCH transmission for a user equipment. In the case that a transmission scheme of the user equipment is configured as codebook-based transmission, two or more transmit precoding matrix indicators are configured. In the case that the transmission scheme of the user equipment is configured as non-codebook-based transmission, two or more SRI indications are configured. The apparatus 220 can further include a transmitter 228 coupled to the at least one processor 224 transmits the transmission configuration parameter set to the user equipment.

Figure 11:
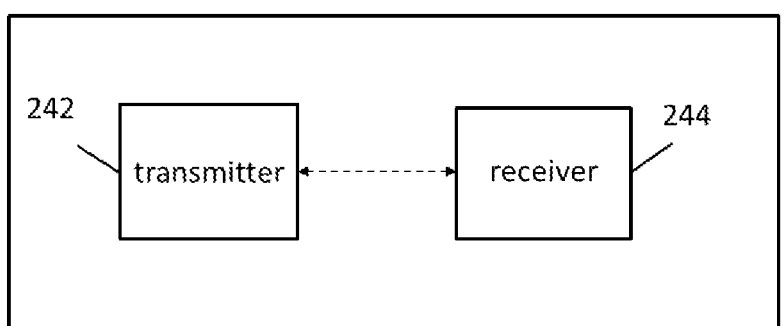
FIG. 11 illustrates a block diagram of an apparatus for Type-1 PUSCH transmissions according to another embodiment of the present disclosure.

FIG. 11 illustrates a block diagram of an apparatus 240 for Type-1 PUSCH transmissions according to another embodiment of the present disclosure.

Referring to FIG. 11, the apparatus 240, for example a UE, may include a transmitter 242, and a receiver 244. The receiver 244 can receive a transmission configuration parameter set for a Type-1 PUSCH transmission. In the case where a transmission scheme of the user equipment is configured as codebook-based transmission in the transmission configuration parameter set, two or more transmit precoding matrix indicators are configured in the transmission configuration parameter set. In the case that the transmission scheme of the user equipment is configured as non-codebook-based transmission in the transmission configuration parameter set, two or more indications for sounding reference signal resource indicator are configured in the transmission configuration parameter set. The transmitter 242 can be coupled to the receiver and perform the Type-1 PUSCH transmission based on the received transmission configuration parameter set.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

What is claimed:

1. A method performed by a base station, the method comprising:

configuring a transmission configuration parameter set for a Type-1 physical uplink shared channel (PUSCH) transmission for a user equipment (UE), wherein:

in response to a transmission scheme of the UE being configured as codebook-based transmission, a first transmit precoding matrix indicator (PMI) is configured by a first high layer parameter of a high layer, a second transmit PMI is configured by a second high layer parameter of the high layer, a first sounding reference signal resource indicator (SRI) is configured by a third high layer parameter of the high layer, and a second SRI is configured by a fourth high layer parameter of the high layer, the high layer comprising a layer above a physical (PHY) layer, wherein at least one of the first transmit PMI and the second transmit PMI indicates a transmission rank; and in response to the transmission scheme of the UE being configured as non-codebook-based codebook-based transmission, two or more indications for SRI are configured by two or more different high layer parameters of the high layer; and transmitting the transmission configuration parameter set to the UE.

2. The method of claim 1, wherein the transmission configuration parameter set comprises a subband size configured by the high layer parameter and the subband size is two physical resource blocks, four physical resource blocks, or a whole band size.

3. The method of claim 1, wherein, in response to the transmission scheme of the UE being configured as codebook-based transmission, said configuring the transmission configuration parameter set comprises configuring one or two sounding reference signal resource indicators.

4. The method of claim 1, wherein:

in response to the transmission scheme of the UE being configured as codebook-based transmission, at least one of the first SRI and the second SRI indicates the transmission rank; and in response to the transmission scheme of the UE being configured as non-codebook-based transmission, at least one of the two or more SRIs indicates a transmission rank.

5. A base station, comprising:

at least one memory; and at least one processor coupled with the at least one memory and configured to cause the base station to:

configure a transmission configuration parameter set for a Type-1 physical uplink shared channel PUSCH transmission for a user equipment (UE), wherein:

in response to a transmission scheme of the UE being configured as codebook-based transmission, a first transmit precoding matrix indicator (PMI) is configured by a first high layer parameter of a high layer, a second transmit PMI is configured by a second high layer parameter of the high layer, a first sounding reference signal resource indicator (SRI) is configured by a third high layer parameter of the high layer, and a second SRI is configured by a fourth high layer parameter of the high layer, the high layer comprising a layer above a physical (PHY) layer, wherein at least one of the first transmit PMI and the second transmit PMI indicates a transmission rank; and in response to the transmission scheme of the UE being configured as non-codebook-based transmission, two or more indications for SRI are configured by two or more different high layer parameters of the high layer; and transmit the transmission configuration parameter set to the UE.

6. The base station of claim 5, wherein, in response to the transmission scheme of the UE being configured as codebook-based transmission, the transmission configuration parameter set comprises a subband size configured by the high layer, and the subband size is two physical resource blocks, four physical resource blocks, or a whole band size.

7. The base station of claim 5, wherein, in response to the transmission scheme of the UE being configured as codebook-based transmission, configuring the transmission configuration parameter set comprises configuring one or two sounding reference signal resource indicators.

8. A method performed by a user equipment (UE), the method comprising:

receiving a transmission configuration parameter set for a Type-1 physical uplink shared channel (PUSCH) transmission, wherein:

in response to a transmission scheme of the UE being configured as codebook-based transmission, a first transmit precoding matrix indicator (PMI) is configured by a first high layer parameter of a high layer, a second transmit PMI is configured by a second high layer parameter of the high layer, a first sounding reference signal resource indicator (SRI) is configured by a third high layer parameter of the high layer, and a second SRI is configured by a fourth high layer parameter of the high layer, the high layer comprising a layer above a physical (PHY) layer, wherein at least one of the first transmit PMI and the second transmit PMI indicates a transmission rank; and in response to the transmission scheme of the UE being configured as non-codebook-based codebook-based transmission, two or more indications for SRI are configured by two or more different high layer parameters of the high layer; and performing the Type-1 PUSCH transmission based on the received transmission configuration parameter set.

9. The method of claim 8, wherein, in response to the transmission scheme of the UE being configured as codebook-based transmission, the transmission configuration parameter set comprises a subband size configured by the high layer, and the subband size is two physical resource blocks, four physical resource blocks, or a whole band size.

10. The method of claim 8, wherein, in response to the transmission scheme of the UE being configured as codebook-based transmission in the transmission configuration parameter set, a subband size is a default value.

11. The method of claim 10, wherein the default value is a whole band size.

12. The method of claim 8, wherein, in response to the transmission scheme of the UE being configured as codebook-based transmission in the transmission configuration parameter set, one or two sounding reference signal resource indicators are configured in the transmission configuration parameter set.

13. The method of claim 12, wherein in response to the two or more sounding reference signal resource indicators being configured in response to the transmission scheme of the UE being configured as codebook-based transmission, performing the Type-1 PUSCH transmission based on the received transmission configuration parameter set comprises:

alternatively assigning one of the two or more sounding reference signal resource indicators for each time slot for the Type-1 PUSCH transmission.

14. The method of claim 12, wherein performing the Type-1 PUSCH transmission based on the received transmission configuration parameter set comprises:

randomly assigning one transmit PMI from the received first transmit PMI and the second transmit PMI for the Type-1 PUSCH transmission.

15. The method of claim 12, wherein performing the Type-1 PUSCH transmission based on the received transmission configuration parameter set comprises:

in response to the transmission scheme of the UE being configured as codebook-based transmission, assigning one transmit PMI from the first transmit PMI and the second transmit PMI for the Type-1 PUSCH transmission in a cyclical assignment mechanism such that the assignment is performed in frequency domain first, followed by the assignment in time domain.

16. The method of claim 12, wherein performing the Type-1 PUSCH transmission based on the received transmission configuration parameter set comprises:

in response to the transmission scheme of the UE being configured as codebook-based transmission, assigning one transmit PMI from the first transmit PMI and the second transmit PMI for the Type-1 PUSCH transmission in a cyclical assignment mechanism such that the assignment is performed in time domain first, followed by the assignment in frequency domain.

17. The method of claim 12, wherein performing the Type-1 PUSCH transmission based on the received transmission configuration parameter set comprises:

for each subband, applying a precoding matrix and the transmission rank indicated by the at least one of the first transmit PMI and the second transmit PMI over antenna ports corresponding to a sounding reference signal resource selected by the sounding reference signal resource indicator.

18. A user equipment (UE), comprising:

at least one memory; and at least one processor coupled with the at least one memory and configured to cause the UE to:

receive a transmission configuration parameter set for a Type-1 physical uplink shared channel PUSCH transmission, wherein:

in response to a transmission scheme of the UE being configured as codebook-based transmission, a first transmit precoding matrix indicator (PMI) is configured by a first high layer parameter of a high layer, a second transmit PMI is configured by a second high layer parameter of the high layer, a first sounding reference signal resource indicator (SRI) is configured by a third high layer parameter of the high layer, and a second SRI is configured by a fourth high layer parameter of the high layer, the high layer comprising a layer above a physical (PHY layer, wherein at least one of the first transmit PMI and the second transmit PMI indicates a transmission rank; and in response to the transmission scheme of the UE being configured as non-codebook-based transmission, two or more indications for SRI are configured by two or more different high layer parameters of the high layer; and perform the Type-1 (PUSCH) transmission based on the received transmission configuration parameter set.

19. The UE of claim 18, wherein, in response to the transmission scheme of the UE being configured as codebook-based transmission, the transmission configuration parameter set comprises a subband size configured by the high layer, and the subband size is two physical resource blocks, four physical resource blocks, or a whole band size.

20. The UE of claim 18, wherein, in response to the transmission scheme of the UE being configured as codebook-based transmission in the transmission configuration parameter set, a subband size is a default value.

* * * * *